United States Patent
Chen et al.

(10) Patent No.: US 7,168,317 B2
(45) Date of Patent: Jan. 30, 2007

(54) PLANAR 3-AXIS INERTIAL MEASUREMENT UNIT

(75) Inventors: Shyu-Mou Chen, Longtan Township, Taoyuan County (TW); Sheau-Shi Tzuoo, Longtan Township, Taoyuan County (TW); Chung-Ta Kau, Longtan Township, Taoyuan County (TW)

(73) Assignee: Chung-Shan Institute of Science and Technology, Taoyuan County (TW)

( * ) Notice: Subject to any disclaimer, the term of this patent is extended or adjusted under 35 U.S.C. 154(b) by 0 days.

(21) Appl. No.: 11/375,034

(22) Filed: Mar. 15, 2006

(65) Prior Publication Data

US 2006/0156816 A1 Jul. 20, 2006

Related U.S. Application Data

(63) Continuation-in-part of application No. 11/124,106, filed on May 9, 2005, now abandoned.

(51) Int. Cl.
*G01P 9/04* (2006.01)
(52) U.S. Cl. ................... 73/504.04; 73/504.12
(58) Field of Classification Search ........... 73/504.03, 73/504.04, 510
See application file for complete search history.

(56) References Cited

U.S. PATENT DOCUMENTS

| 5,392,650 A | 2/1995 | O'Brien et al. |
| 5,753,817 A | 5/1998 | Park et al. |
| 6,041,653 A | 3/2000 | Ichikawa et al. |
| 6,928,873 B2 | 8/2005 | Chen et al. |

OTHER PUBLICATIONS

Xie, Huikai, *Gyroscope and Micromirror Design Using Vertical-Axis CMOS-MEMS Actuation and Sensing*, PHD Thesis, Carnegie Mellon University, May, 2002, Fig. 6-38, p. 194. Copy at http://www.ece.cmu.edu/~mems/pubs/pdfs/ece/phd_thesis/0123_xie-2002.pdf.

*Primary Examiner*—Hezron Williams
(74) *Attorney, Agent, or Firm*—Birch, Stewart, Kolasch & Birch, LLP (57) ABSTRACT

The present invention relates to a z-axial solid-state gyroscope. Its main configuration is manufactured with a conductive material and includes two sets of a proof mass and two driver bodies suspended between two plates by an elastic beam assembly. Both surfaces of the driver bodies and the proof masses respectively include a number of grooves respectively perpendicular to a first axis and a second axis. The surfaces of the driver bodies and the proof masses and the corresponding stripe electrodes of the plates thereof are respectively formed a driving capacitors and a sensing capacitors. The driving capacitor drives the proof masses to vibrate in the opposite direction along the first axis. If a z-axial angular velocity input, a Coriolis force makes the two masses vibrate in the opposite direction along the second axis. If a first axial acceleration input, a specific force makes the two masses move in the same direction along the first axis. If a second axial acceleration input, a specific force makes the two masses move in the same direction along the second axis. Both inertial forces make the sensing capacitances change. One z-axial solid-state gyroscopes and two in-plane axial gyroscopes can be designed on a single chip to form a complete three-axis inertial measurement unit.

7 Claims, 8 Drawing Sheets

PLANAR 3-AXIS INERTIAL MEASUREMENT UNIT

This application is a Continuation-In-Part of copending application Ser. No. 11/124,106 filed on May 9, 2005, now abandoned the entire contents of which are hereby incorporated by reference.

BACKGROUND OF THE INVENTION

1. Field of the Invention

The present invention relates to solid-state gyroscopes and a three-axis inertial measurement unit, which are in particular manufactured by a micro-mechanical technique, and can sense three axes angular velocities and three axes accelerations simultaneously.

2. The Related Art

The sensing axis of angular velocity for most of conventional gyroscopes manufactured by a micro-mechanical technique is parallel to the structure surface thereof. Furthermore, in case of needing to concurrently sense three axial angular velocities and accelerations, if the sensing axis of angular velocity is perpendicular to the structure surface thereof, the gyroscopes and accelerometers can be built on a single chip to measure three axial angular velocities and accelerations, and the cost and size thereof can be thus largely reduced. Therefore the other types of gyroscopes are born.

SUMMARY OF THE INVENTION

Figure 1:
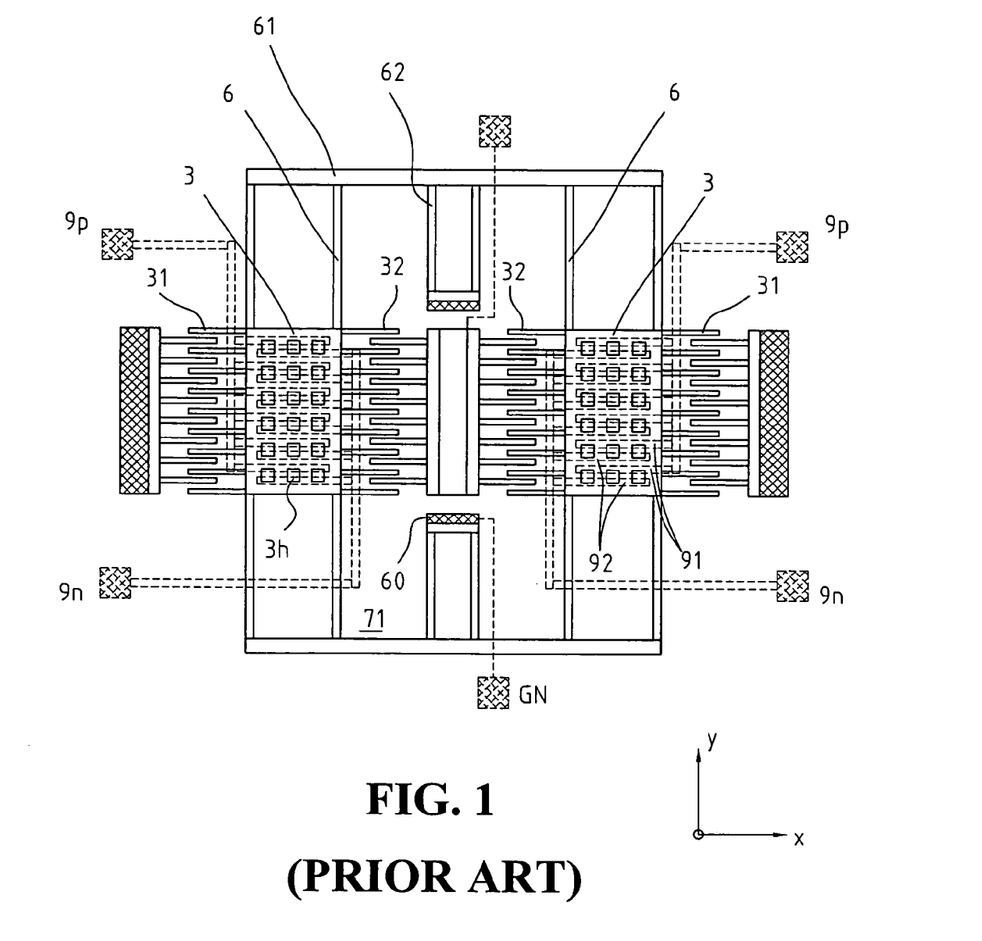
FIG. 1 is a schematic view of a configuration of a conventional solid-state gyroscope, which can sense an angular velocity perpendicular to the structure surface thereof.

FIG. 1 shows a configuration of a conventional solid-state gyroscope, comprising two proof masses 3 and two comb drivers 31, 32 corresponding to each proof mass. Its sensing axis is perpendicular to the structure surface thereof. The proof masses 3 and the comb drivers 31, 32 are connected to an anchor 60 fixed on a substrate 71 by a number of elastic beams 6, 61, 62. The proof masses 3 have a number of regularly arranged holes 3h. The surface of the substrate 71 there under includes a number of pairs of stripe electrodes 91, 92 perpendicular to a sensing axis (y-axis) and respectively connected to bond pads 9p, 9n. The distance between corresponding points of the holes 3h along the y-axis is the same as that of the pairs of stripe electrodes 91, 92. The pairs of stripe electrodes 91, 92 and the surface of the proof mass 3 are formed two sensing capacitors c9p, c9n. The proof masses 3, comb drivers 31, 32 and elastic beams 6, 61, 62 may be formed from metal, doped silicon, silicon, or polysilicon. The lengths, widths and thickness of the elastic beams 6, 61, 62 are designed to facilitate the two axial compliances parallel to the structure surface thereof.

The two outer comb drivers 31 are respectively excited with a DC bias and an AC voltage at the mechanical resonant frequency thereof to cause the two proof masses 3 to vibrate in the opposite direction along the x-axis. The two inner comb drivers 32 are respectively excited with a DC bias and a high frequency AC voltage of opposite phase, and are mainly used to sense the driven amplitudes of the proof masses 3 and feedback the signals thereof for controlling the driven amplitudes. If a z-axial angular velocity input, a Coriolis force makes the two proof masses 3 vibrate in the opposite direction along the y-axis and causes a change in the capacitances of the sensing capacitors c9p, c9n. The sensing capacitors c9p, c9n are respectively excited with a DC bias and a high frequency AC voltage of opposite phase. The current sensed from the output node GN is proportional to the differential displacement of the two proof masses 3.

There is another type of sensing capacitor, a comb capacitor (not shown in FIG. 1), being able to be used to sense the movements of the proof masses 3 along the y-axis. When the proof masses 3 move along the y-axis, the change in the distance of the capacitors results in the change in the capacitance thereof, which can be used to sense the displacements of the proof masses 3.

Although the second type of the conventional solid-state gyroscope can sense the angular velocity perpendicular to the structure surface thereof, it is more difficult to manufacture a practical electrostatic comb driver or a comb sensing capacitor. The reason is that they have two deep and spaced narrow vertical surfaces, the aspect ratio decreases with the increase in depth. The sensitivity thereof is also limited.

The improvements of the present invention comprise: the drivers and the sensors using a structure of stripe capacitors with an edge effect; the manufacturing process being simple; no need to manufacture two deep and spaced narrow vertical surfaces; no special manufacturing process requirement of high aspect ratio; and suitable for multiple fabrication techniques.

In summary, the present invention discloses: (1) a z-axial solid-state gyroscope being able to sense an angular velocity perpendicular to the structure surface thereof and to sense two axes acceleration parallel to the structure surface thereof; (2) a solid-state gyroscope being able to sense an angular velocity parallel to the structure surface and to sense an axial acceleration perpendicular to the structure surface thereof and to sense an axial acceleration parallel to the structure surface thereof; (3) one or two z-axial solid-state gyroscopes and two solid-state gyroscopes with sensing axes parallel to the structure surface thereof being designed on a single chip to form a functionally complete planar inertial measurement unit (PIMU) that can be concurrently manufactured in one manufacturing process, and the size and the manufacturing and assembling cost thereof can be largely reduced.

BRIEF DESCRIPTION OF THE DRAWINGS

The objects, effectiveness and configurations of the present invention will be more definitely understood after reading the detailed description of the preferred embodiment thereof with reference to the accompanying drawings.

FIG. 2 is a schematic view of a configuration of a z-axial solid-state gyroscope in accordance with a preferred embodiment of the present invention, in which

FIG. 6 is a schematic view of a configuration of an x-axial solid-state gyroscope, the sensing axis thereof parallel to the structure surface thereof, in accordance with a preferred embodiment of the present invention, in which

6b shows a schematic view of stripe electrodes of driving capacitors and sensing capacitors on a surface of a glass plate.

FIG. 7 is a schematic view of a configuration of a planar three-axis inertial measurement unit constructed by four solid-state gyroscopes in which

DETAILED DESCRIPTION OF THE PREFERRED EMBODIMENT

Figure 2A:
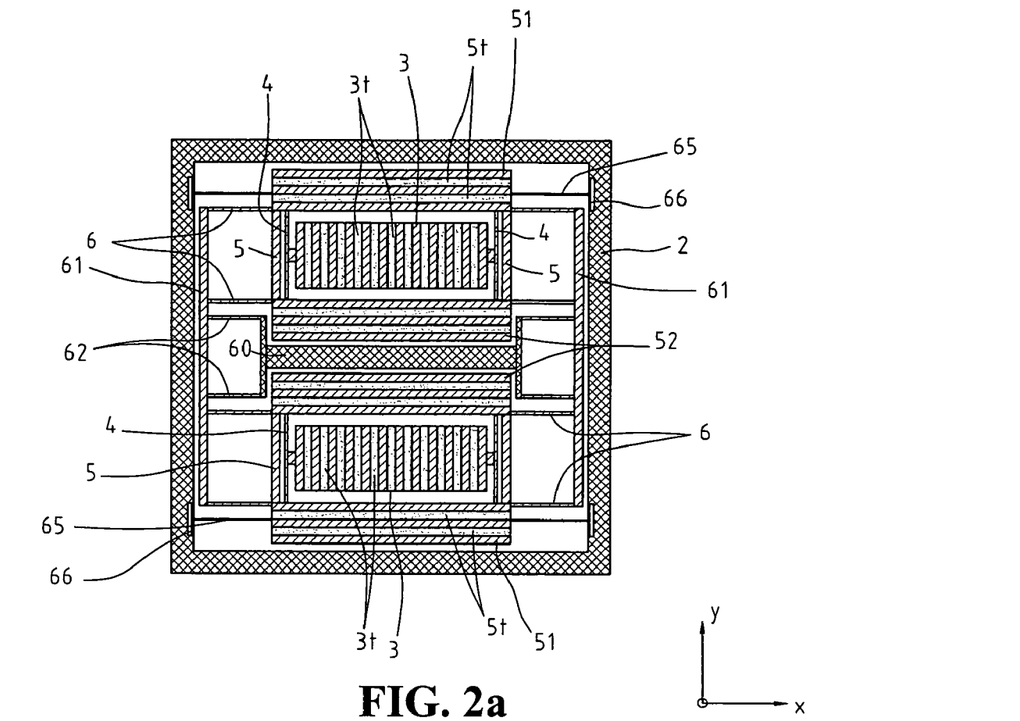
FIG. 2a shows a top view of the main configuration thereof and FIG. 2b shows a schematic view of stripe electrodes of driving capacitors and sensing capacitors on a surface of a glass plate.

Referring to FIG. 2a, which shows a schematic view of a configuration of a z-axial solid-state gyroscope of a preferred embodiment in accordance with the present invention, the configuration is manufactured with a conductive material and comprises an outer frame 2 and a central anchor 60. The interior of the outer frame 2 has two sets of a proof mass 3 and two driver bodies 51, 52. Each proof mass 3 is respectively connected to the corresponding two driver bodies 51, 52 thereof by at least one sensing elastic beam 4. Two connection beams 5 connect the two driver bodies 51, 52 to each other. Each proof mass 3 and the corresponding driver bodies 51, 52 thereof are respectively connected to a common connection beams 61 by a number of driving elastic beams 6. The common connection beams 61 are connected to a common elastic beams 62 fixed at the central anchor 60. Each proof mass 3 and the corresponding driver bodies 51, 52 thereof are also additionally suspended to the outer frame 2 by a number of elastic beams 65, 66.

Two glass plates 71, 72 are respectively positioned in front and rear of the main configuration thereof and mounted with the outer frame 2 and the anchor 60 together, so that the other elements are suspended between the two glass plates 71, 72. The sensing beams 4 make the proof masses 3 facilitate move along a specially designated direction (defined as x-axis) parallel to the surfaces of the glass plates 71, 72. The driving elastic beams 6, the common elastic beams 62, and the elastic beams 65, 66 make the proof masses 3 and the driver bodies 51, 52 facilitate move along another specially designated direction (defined as y-axis) parallel to the surfaces of the glass plates 71, 72. Both surfaces of the proof masses 3 respectively have a number of grooves $3t$ perpendicular to the x-axis. Both surfaces of the driver bodies 51, 52 respectively have a number of grooves $5t$ perpendicular to the y-axis.

Figure 2B:
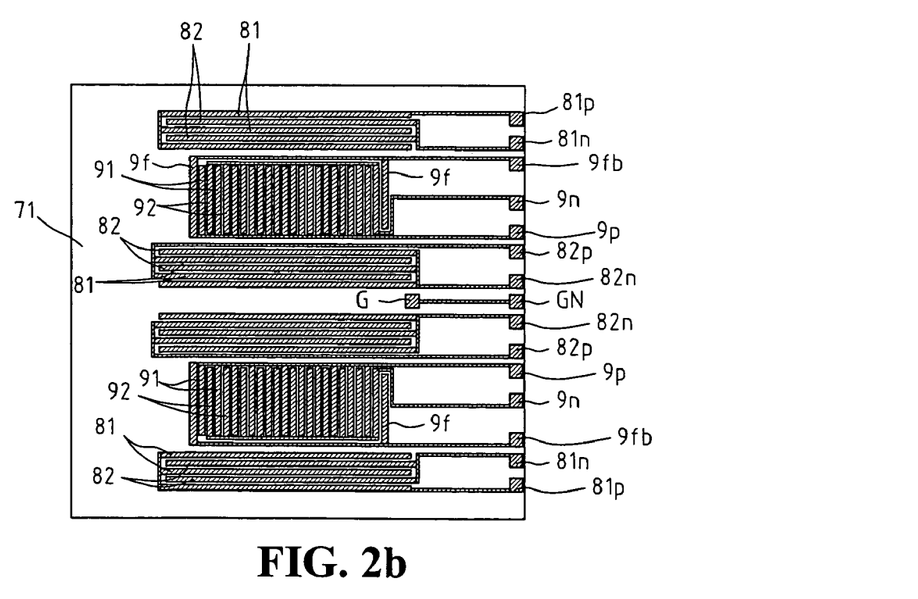
Figure 3:
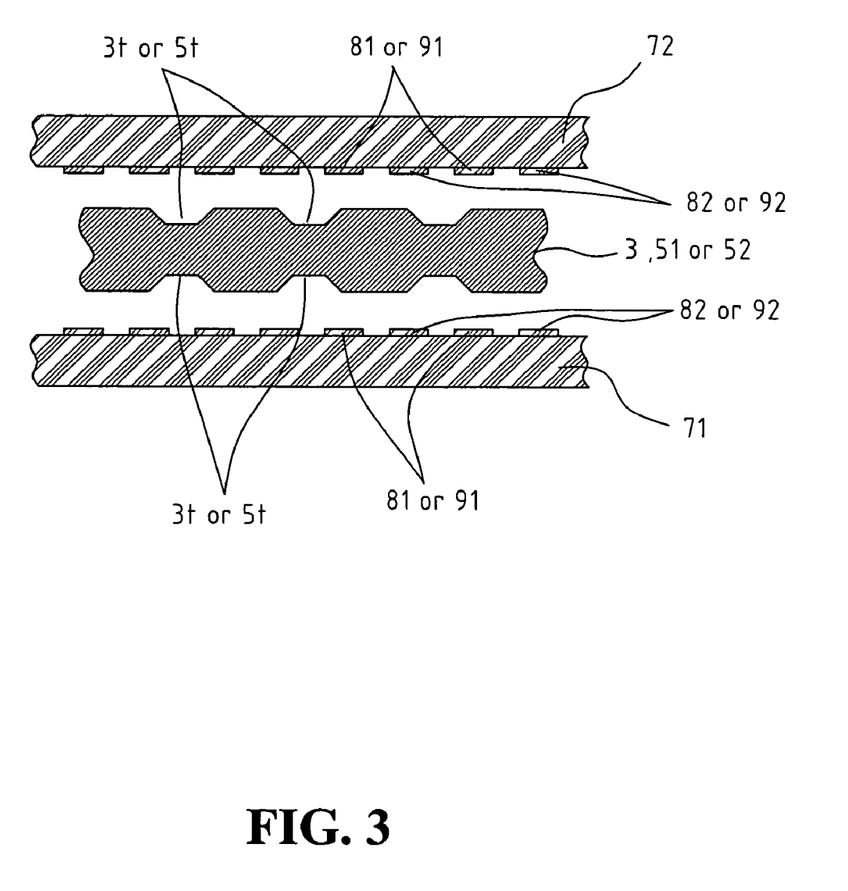
FIG. 3 is a cross-sectional schematic view of a configuration of the stripe electrodes of the driving capacitor and the sensing capacitor.

The surface of each glass plate facing the silicon chip and corresponding to each driver body 51 includes two sets of interposed stripe electrodes 81, 82 parallel to the grooves $5t$, which are respectively connected to a bond pads $81p$, $81n$ (see FIG. 2b). The relative positions of the grooves $5t$ on the surface of the driver bodies 51 and the corresponding stripe electrodes 81, 82 thereof are shown in FIG. 3. Each surface of each driver body 51 and the corresponding stripe electrodes 81, 82 thereof respectively are formed two sets of driving capacitors $c81p$, $c81n$. In similar, the surface of each glass plate facing the silicon chip and corresponding to each driver body 52 include another two sets of interposed stripe electrodes 81, 82 parallel to the grooves $5t$, which are respectively connected to a bond pads $82p$, $82n$. Another two sets of driving capacitors $c82p$, $c82n$ are formed.

The surface of each glass plate facing the silicon chip and corresponding to the grooves $3t$ on the surface of each proof mass 3 thereof also include two sets of interposed stripe electrodes 91, 92 parallel to the grooves $3t$, which are respectively connected to a bond pads $9p$, $9n$. Each surface of each proof mass 3 and the corresponding stripe electrodes 91, 92 thereof are formed two sets of sensing capacitors $c9p$, $c9n$.

The outer driving capacitors $c81p$, $c81n$ are respectively excited with a DC bias and an AC voltage of opposite phase at the mechanical resonant frequency thereof to cause the two proof masses 3 to vibrate in the opposite direction along the y-axis. If a y-axial acceleration input, a specific force makes the two sets of a proof mass 3 and two driver bodies 51, 52 move in same direction along the y-axis. Both driving force and specific force make the areas of the stripe capacitors change and thus make the capacitances of the driving capacitors $c82p$, $c82n$ change.

The inner driving capacitors $c82p$, $c82n$ are respectively excited with a DC bias and an high frequency AC voltage of opposite phase thereof, and are used to sense the driven amplitude of the proof masses 3 and the y-axis acceleration. The signals induced by the driving force and the y-axis specific force is respectively an AC signal and a low frequency or DC signal, which can be separated into a driven amplitude and a y-axial acceleration signal by a signal processing technique and can be feed backed to capacitors $c81p$, $c81n$ for controlling the driven amplitude and for rebalancing of the y-axis specific force.

If a z-axial angular velocity input, a Coriolis force makes the two proof masses 3 vibrate in the opposite direction along the x-axis. If an x-axial acceleration input, a specific force makes the two proof masses 3 move in same direction along the x-axis. Both inertial forces make the areas of the stripe capacitors change and thus make the capacitances of the sensing capacitors $c9p$, $c9n$ change.

The sensing capacitors $c9p$, $c9n$ are respectively excited with a DC bias and a high frequency AC voltage of opposite phase. The current sensed from the output node GN is proportional to the differential displacement of the two proof masses 3. The signals induced by an angular velocity and an x-axial acceleration is respectively an AC signal and a low frequency or DC signal, which can be separated into a z-axial angular velocity and an x-axial acceleration signal by a signal processing technique. A part of the stripe electrodes 91, 92 of the sensing capacitors $c9p$, $c9n$ can be isolated as a feedback electrode $9f$ (see FIG. 2b) for the rebalancing of the Coriolis force and the x-axis specific force.

Figure 4:
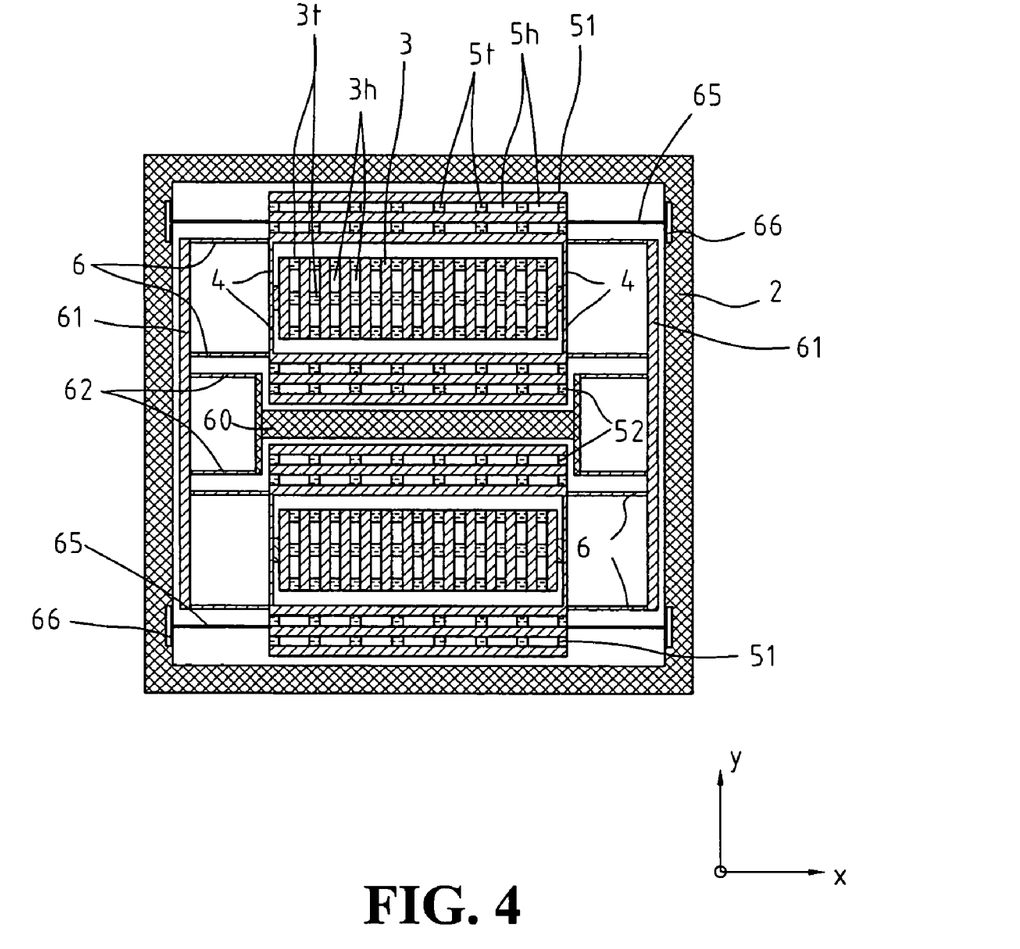
FIGS. 4 and 5 are schematic views of the configurations of the z-axial solid-state gyroscopes in accordance with another two preferred embodiments of the present invention.
Figure 5:
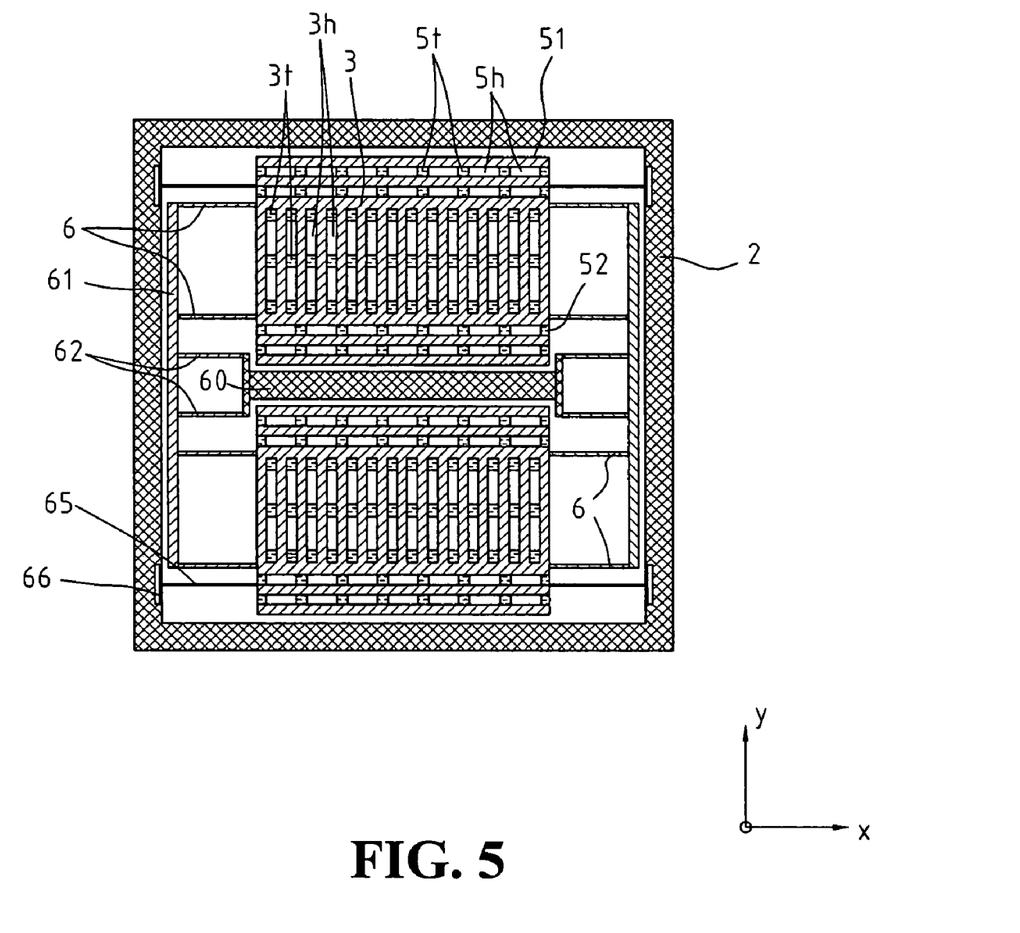

There are many different types of the structure shown in FIGS. 4 and 5. The grooves $3t$, $5t$ on the surfaces of the proof masses 3 and the driver bodies 51, 52 are further etched a plurality of deep holes or through holes $3h$, $5h$ to lessen the burden of the drivers and thus promote the driving performance thereof. In addition, as shown in FIG. 4, the connection beams 5 are deleted but the sensing beams 4 still connect to the two driver bodies 51, 52. Referring to FIG. 5, the sensing beams 4 and the connection beams 5 are deleted, the proof masses 3 and the two driver bodies 51, 52 are directly connected together, the roles of the sensing beams 4 are instead of the common connection beams 61.

The configuration of the present invention can be manufactured by dissolved wafer process, surface micromachining, dry etching, LIGA, and bulk micromachining etc. There has no need to fabricate two deep and spaced narrow vertical surfaces same as those of a conventional comb structure, i.e., no special manufacturing process requirement of high aspect ratio.

The above z-axial solid-state gyroscope and two in-plane axial gyroscopes can be designed on a single chip to form a functionally complete planar inertial measurement unit having functions of three-axial gyroscopes and three-axial accelerometers.

Figure 6A:
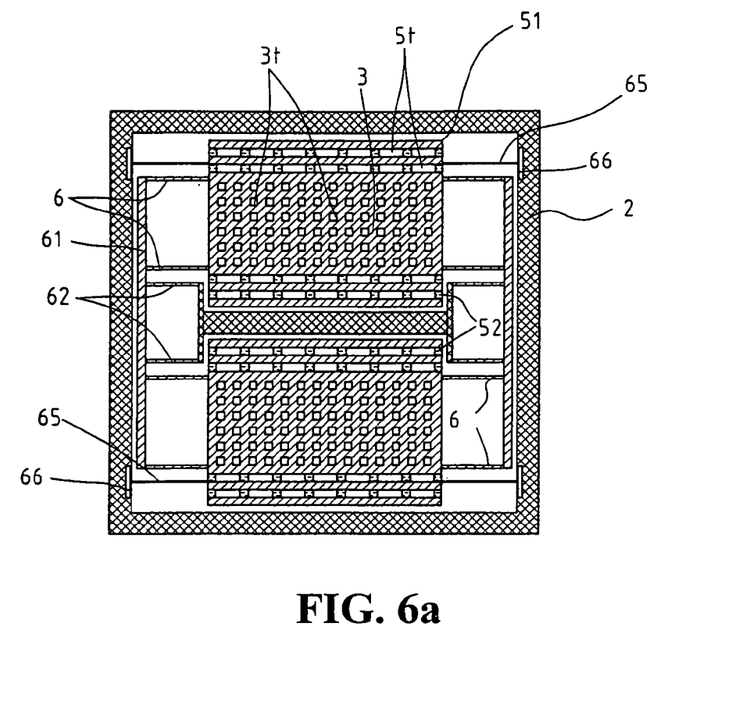
FIG. 6a shows a top view of the main configuration thereof and FIG.
Figure 6B:
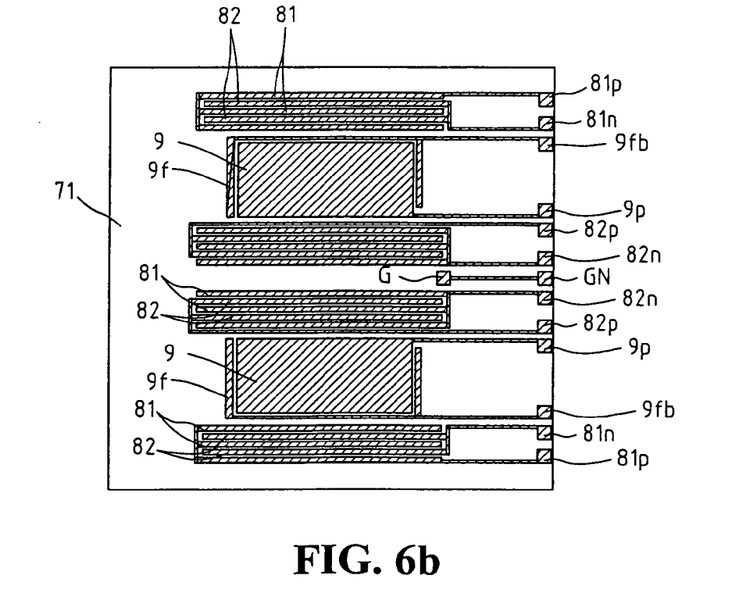

FIG. 6 shows a schematic view of an x-axial solid-state gyroscope in accordance with the present invention, the sensing axis thereof being parallel to its structure surface. FIG. 6a is a top view of the configuration thereof. FIG. 6b shows a schematic view of interposed stripe electrodes 81, 82 of the driving capacitors and electrodes 9 of the sensing capacitors on the surface of a glass plate 71. The configuration of the x-axial solid-state gyroscope in FIG. 6 is substantially same as that of the z-axial solid-state gyroscope in FIG. 5. The major differences between both gyroscopes are: (1) the sensing beams 6 of the x-axial solid-state gyroscope making the proof masses 3 facilitate move along the z-axis, but along the x-axis for the z-axial solid-state gyroscope in FIG. 5; and (2) each sensing electrode on each glass plate corresponding to each proof mass 3 for the x-axial solid-state gyroscope being a single electrode 9, but two sets of interposed stripe electrodes 91, 92 for the z-axial solid-state gyroscope.

In order to assemble a planar three-axis inertial measurement unit, a y-axis solid-state gyroscope is required except the above x-axial and z-axial gyroscopes. The configuration of the y-axis solid-state gyroscope is the same as the x-axial solid-state gyroscope but rotates an angle about the z-axis.

Three solid-state gyroscopes (G1, G2, G3) are assembled to form a planar three-axis inertial measurement unit. Axial arrangements of the driving axis, the sensing axis, the angular velocity input axis, and the acceleration input axis for various gyroscopes are summarized in Table 1.

TABLE 1

Axial arrangements of various gyroscopes for a planar three-axis inertial measurement unit.

| Gyroscope No. | Driving axis | Sensing axis | Angular velocity input axis | Acceleration input axis |
| --- | --- | --- | --- | --- |
| G1 | Dy | Dz | Wx | Az, Ay |
| G2 | Dx | Dz | Wy | Az, Ax |
| G3 | Dy | Dx | Wz | Ax, Ay |
| G4 | Dx | Dy | Wz | Ay, Ax |

From Table 1, there are two sets of output signals of each axial acceleration, that is, there is redundancy property for each axial acceleration detection in the present invention. If a specific axial angular rate detection needs redundancy property, we can add a fourth gyroscope corresponding to the specific axial, for example, if we need z-axial angular rate detection possess redundancy, we can add a second z-axial gyroscope, as shown in table 1.

Figure 7A:
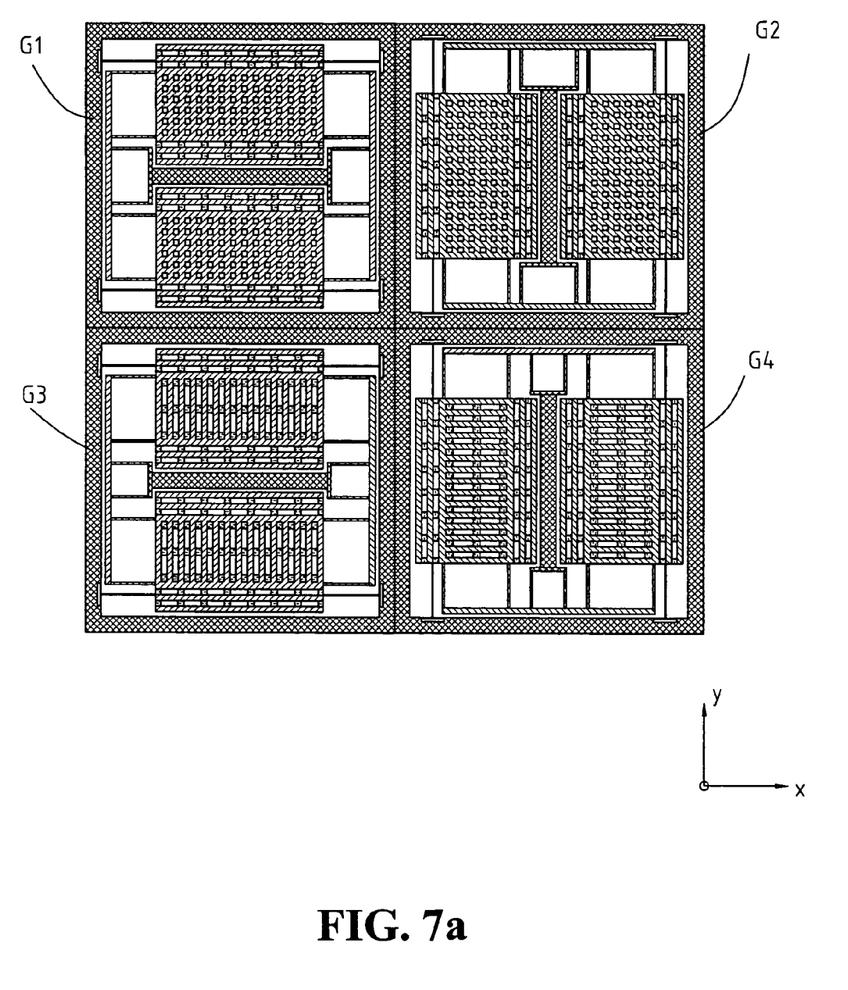
FIG. 7a shows a top view of the main configuration thereof and FIG. 7b shows a schematic view of stripe electrodes of driving capacitors and sensing capacitors on a surface of a glass plate.
Figure 7B:
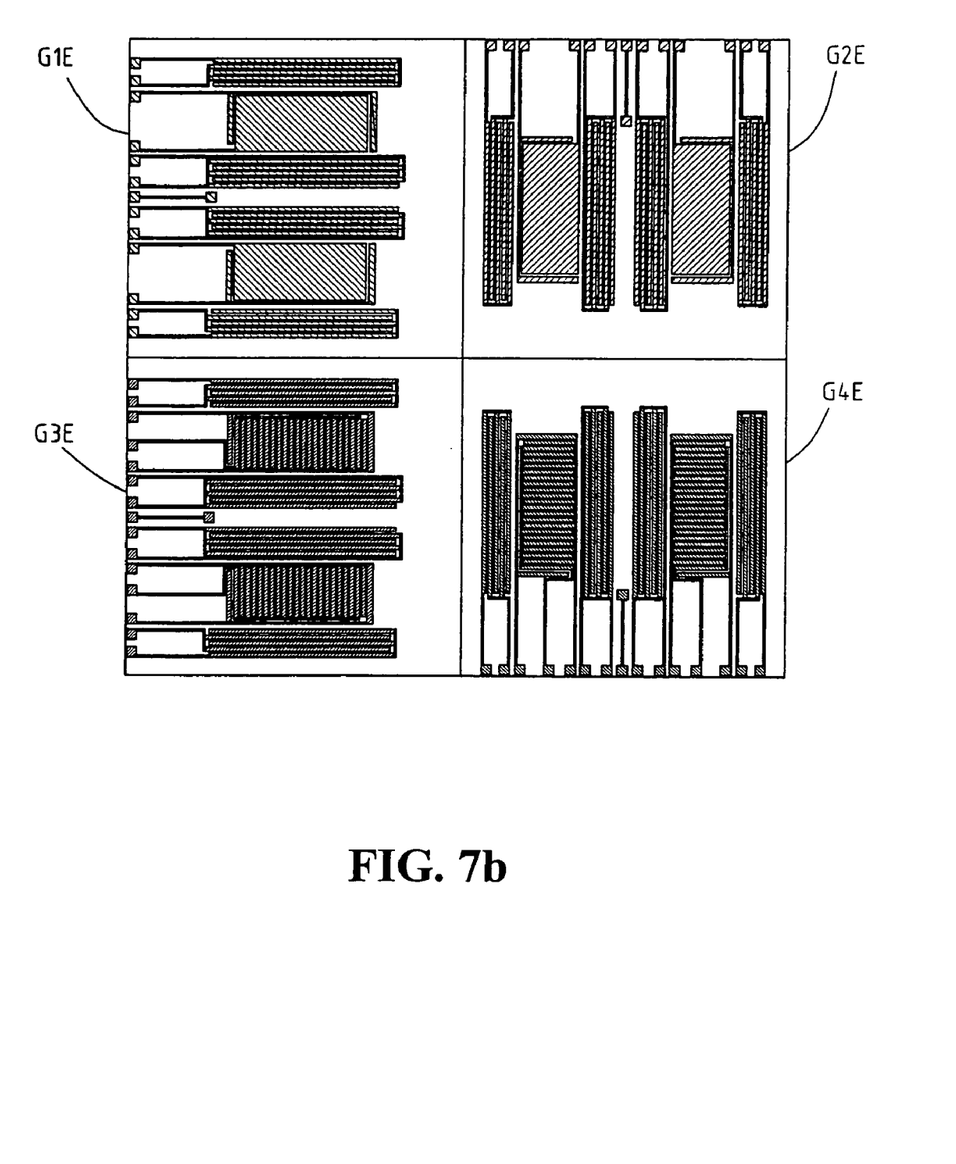

FIG. 7 shows a schematic view of a planar three-axis inertial measurement unit constructed by four solid-state gyroscopes (G1, G2, G3, G4) in accordance with the present invention, in which FIG. 7a shows a top view of the main configuration thereof, wherein the axial arrangements of the driving axis, the sensing axis, the angular velocity input axis and the acceleration input axes for various gyroscopes are the same as those listed in Table 1, and FIG. 7b shows a schematic view of four sets of stripe electrodes of driving capacitors and sensing capacitors (G1E, G2E, G3E, G4E) on a surface of a glass plate, corresponding to the four gyroscopes (G1, G2, G3, G4). respectively.

The above description is only for illustrating the preferred embodiments of the present invention, and not for giving any limitation to the scope of the present invention. It will be apparent to those skilled in this art that all equivalent modifications and changes shall fall within the scope of the appended claims and are intended to form part of this invention.

What is claimed is:

1. A planar solid-state inertial measurement unit, manufactured mainly by a conductive material and comprising three solid-state gyroscopes installed between two parallel plates;

a first solid-state gyroscope, an angular velocity sensing axis of which is parallel to an x-axis of the plate surfaces, comprising: a first and second sets of a proof mass and two driver bodies, a first elastic beam assembly, a first drivers assembly and a first sensors assembly; the first and second sets of proof mass and driver bodies suspended between the two plates by the first elastic beam assembly so that the first and second sets of proof mass and driver bodies can move along a y-axis parallel to the plate surfaces, and can also move along a z-axis perpendicular to the plate surfaces; the first drivers assembly are divided into two parts: the first part of the first drivers being excited to drive the proof mass to vibrate in the opposite direction along the y-axis; and the second part of the first drivers being able to sense a vibration amplitude in the opposite direction and a displacement in the same direction of the first and second sets of proof mass and driver bodies along the y-axis, and feedback it to the first part of the first drivers to control the vibration amplitude and to rebalance the specific force of the first and second proof mass along the y-axis; the first sensors assembly being able to sense the vibration in the opposite direction and the displacement in the same direction of the first and second proof masses along the z-axis; the first solid-state gyroscope sensing the x-axial angular velocity and the z-axial acceleration and the y-axial acceleration;

a second solid-state gyroscope, an angular velocity sensing axis of which is parallel to the y-axis of the plate surfaces, comprising: a third and fourth sets of a proof mass and two driver bodies, a second elastic beam assembly, a second drivers assembly and a second sensors assembly; the third and fourth sets of proof mass and driver bodies suspended between the two plates by the second elastic beam assembly so that the third and fourth sets of proof mass and driver bodies can move along the x-axis parallel to the plate surfaces, and can also move along the z-axis; the second drivers assembly are divided into two parts: the first part of the second drivers being excited to drive the proof mass to vibrate in the opposite direction along the x-axis; and the second part of the second drivers being able to sense a vibration amplitude in the opposite direction and a displacement in the same direction of the third and fourth sets of proof mass and driver bodies along the x-axis, and feedback it to the first part of the second drivers to control the vibration amplitude of the third and fourth proof mass and to rebalance the specific force along the x-axis; the second sensors assembly being able to sense the vibration in the opposite direction and the displacement in the same direction of the third and fourth proof masses along the z-axis; the second solid-state gyroscope sensing the y-axial angular velocity and the z-axial acceleration and x-axial acceleration;

a third solid-state gyroscope, a z-axial angular velocity sensing axis of which is perpendicular to the plate surfaces, comprising: a fifth and sixth sets of a proof mass and two driver bodies, a third elastic beam assembly, a third drivers assembly and a third sensors assembly; the fifth and sixth sets of proof mass and driver bodies suspended between the two plates by the third elastic beam assembly so that the fifth and sixth sets of proof mass and driver bodies can move along the y-axis parallel to the plate surfaces, and can also move along the x-axis; the third drivers assembly are divided into two parts: the first part of the third drivers being excited to drive the proof mass to vibrate in the opposite direction along the y-axis; and the second part of the third drivers being able to sense a vibration amplitude in the opposite direction and a displacement in the same direction of the fifth and sixth sets of proof mass and driver bodies along the y-axis, and feedback it to the first part of the third drivers to control the vibration amplitude of the fifth and sixth proof mass and to rebalance the specific force along the y-axis; the third sensors assembly being able to sense the vibration in the opposite direction and the displacement in the same direction of the fifth and sixth proof masses along the x-axis; the third solid-state gyroscope sensing the z-axial angular velocity and the x-axial acceleration and the y-axial acceleration;

each set of proof mass and driver bodies of each gyroscope are arranged such that the proof mass being between the two driver bodies and joined together.

2. The planar solid-state inertial measurement unit as claimed in claim 1, wherein the elastic beam assembly of each gyroscope comprises:

two common connection beams, positioned at both sides of the proof masses;

a number of first elastic beams, connecting the proof masses to the common connection beams; and a number of second elastic beams, connecting the common connection beams to a central anchor fixed at the two plates.

3. The planar solid-state inertial measurement unit as claimed in claim 2, wherein each elastic beam assembly further comprises a number of third and fourth elastic beams connecting the proof masses and the driver bodies to an outer frame fixed at the two plates.

4. The planar solid-state inertial measurement unit as claimed in claim 1, wherein each drivers assembly is constructed by:

electrodes on the surface of each plate facing to the corresponding surface of each driver body;

each surface of each driver body of the first, second and third gyroscopes respectively including a number of grooves or stripe holes perpendicular to the y-axis, x-axis, and y-axis, respectively;

the surface of each plate facing to the corresponding driver body being formed of two sets of driving electrodes, respectively including a number of stripe electrodes parallel to the grooves or stripe holes of the corresponding driver body, the two sets of driving stripe electrodes being interposed with each other and being formed of two sets of driving capacitors with the corresponding surface of the driver body.

5. The planar solid-state inertial measurement unit as claimed in claim 1, wherein the first and second sensors assembly are respectively constructed by each surface of the first and second proof masses, and each surface of the third and fourth proof masses, and the electrodes on the surface of each plate facing to the corresponding proof mass.

6. The planar solid-state inertial measurement unit as claimed in claim 1, wherein the third sensors assembly is constructed by each surface of the fifth and sixth proof masses and the electrodes on the surface of each plate facing to the corresponding proof mass;

each surface of the fifth and sixth proof masses including a number of grooves or stripe holes perpendicular to the x-axis;

the surface of each plate facing to the corresponding proof mass being formed of two sets of sensing electrodes, respectively including a number of stripe electrodes parallel to the grooves or stripe holes of the proof mass, the two sets of sensing stripe electrodes being interposed with each other and being formed of two sets of sensing capacitors with the corresponding surface of the proof mass.

7. The planar solid-state inertial measurement unit as claimed in claim 1, further comprising a fourth solid-state gyroscope, a z-axial angular velocity sensing axis of which is perpendicular to the plate surfaces, the fourth solid-state gyroscope comprising: a seventh and eighth sets of a proof mass and two driver bodies, a fourth elastic beam assembly, a fourth drivers assembly and a fourth sensors assembly; the seventh and eighth sets of proof mass and driver bodies suspended between the two plates by the fourth elastic beam assembly so that the seventh and eighth sets of proof mass and driver bodies can move along the x-axis parallel to the plate surfaces, and can also move along the y-axis; the fourth drivers assembly are divided into two parts: the first part of the fourth drivers being excited to drive the proof mass to vibrate in the opposite direction along the x-axis; and the second part of the fourth drivers being able to sense a vibration amplitude in the opposite direction and a displacement in the same direction of the seventh and eighth sets of proof mass and driver bodies along the x-axis, and feedback it to the first part of the fourth drivers to control the vibration amplitude and to rebalance the specific force of the seventh and eighth proof mass along the x-axis; the fourth sensors assembly being able to sense the vibration in the opposite direction and the displacement in the same direction of the seventh and eighth proof masses along the y-axis; the fourth solid-state gyroscope sensing the z-axial angular velocity and the y-axial acceleration and the x-axial acceleration.

* * * * *